Patented Nov. 14, 1939

2,180,142

UNITED STATES PATENT OFFICE 2,180,142

COMPOSITE POLYCHLOROPHENOL PRODUCT

Kent R. Fox and Edmund C. Hyry, St. Louis, and Ira Hatfield, Webster Groves, Mo., assignors to Monsanto Chemical Company, St. Louis, Mo., a corporation of Delaware No Drawing. Application April 2, 1938, Serial No. 199,734

6 Claims. (Cl. 134—78.6)

The present invention relates to wood preservation and compositions for the treatment of wood and other cellulosic materials for the purpose of protecting them from the ravages of sapstain and decay organisms and fungi. The invention relates specifically to compositions for this purpose comprising polychlorophenols and has as its particular object to provide the polychlorophenol in an improved form which will facilitate the preparation of such wood-treating compositions and will reduce the possible hazard to health incident to the handling of the polychlorophenol.

Polychlorophenols, particularly pentachlorophenol, have proved of outstanding value in the protection of wood and similar cellulosic material from attack by stain, decay and mold fungi and micro-organisms. Polychlorophenols, however, possess certain undesirable physical properties. They are very light in powdered form and are easily blown about. Since polychlorophenols are apt to produce local irritation of the skind and mucous membranes of the nose and throat, producing sneezing, a polychlorophenol in powdered form is a hazard and special precautions are required in using such powdered materials. Polychlorophenols dissolve very slowly in various solvents that are used in the preparation of wood-preserving solutions, and hence necessitate additional steps in preparing such solutions. Compacting or tabletting polychlorophenols reduces the tendency to dust or blow but increases their cost. A further objection to the use of polychlorophenols is that arising from the tendency of the polychlorophenols to "bloom" on the treated article, that is, the polychlorophenol in a liquid treating composition left on the surface of the wood after treatment crystallizes on evaporation of the solvent. The crystallized material is easily brushed or blown from the surface and thus affords no protection to the exposed wood. Furthermore, when blooming occurs, some of the polychlorophenol which has penetrated into the wood appears to work to the surface as the solvent evaporates, and thus makes the protective treatment less effective than it would otherwise be.

We have now discovered that resins can be fluxed or fused with polychlorophenols to form homogeneous masses which solidify on cooling. In these solid masses the polychlorophenol is uniformly distributed throughout and dissolves to give uniform compositions. Such masses provide the polychlorophenol in a compacted form which will not dust or blow like the powdered form. Furthermore, the rapidity of solution of the polychlorophenol in organic solvents is not reduced as a result of the intimate incorporation of the rosin, particularly in those hydrocarbon solvents that are least costly for the preparation of liquid wood-treating compositions such as petroleum naphthas and fuel oils. The presence of the rosin in the wood-treating solution permits the dissolution of a greater proportion of the polychlorophenol in the solvent and also prevents the separation of the polychlorophenol should the liquid composition be subjected to cooling. In the form of a composite resinous mass, the polychlorophenol bulk is reduced significantly without an appreciable diminution of the ease of solubility from that of the powdered form of the material.

The polychlorophenol-resin composite masses dissolve readily in solvents such as petroleum naphtha and fuel oils and when wood is treated with such dissolved compositions the tendency of the polychlorophenol to bloom on drying is suppressed. As a result of this discovery it is possible to provide compositions consisting of the composite polychlorophenol-resin mass dissolved in a high-boiling petroleum oil such as Mid-Continent No. 2 fuel oil (Shell Petroleum Corp.) which liquid composition can be applied to the wood by brushing.

The fused polychlorophenol-resin compacted mases of the invention are similar to resins in appearance. They have a conchoidal or vitreous fracture and are not as readily disintegrated, for example, by abrasion, as is either the resin or the pure polychlorophenol. As a result, the new compacted masses can be shipped without fear of dusting whereas the pure polychlorophenols, because of their ease in crumbling or disintegrating by abrasion, have required special precautions in shipping. These new resinous masses can be molded in various sizes and forms according to known methods. It is possible to provide compacted bricks or masses of uniform weight, thereby facilitating the preparation of solutions of definite strength therefrom without the necessity of weighing.

In preparing the composite polychlorophenol products of the invention we melt the resin and thereafter add the polychlorophenol and continue the heating until a clear homogeneous melt is obtained. The order may of course be reversed, that is, the resin may be added to the molten polychlorophenol. The mass is then poured into forms which hold a definite weight or is poured into large pans or shipping containers and allowed to cool and solidify. Masses that were solidified in large pans may be subsequently broken up and used in that form or they may be ground to a suitable degree of fineness and molded under heat and pressure in forms of the shape in which the material is to be dispensed.

The proportions of resin and polychlorophenol which are to be incorporated in the masses may be varied but will be controlled to some extent by the composition of the particular liquid treating composition that is to be prepared therefrom. Generally, equal parts of resin and polychlorophenol are desirable, but the particular resin should be present in ample proportion to prevent any blooming from solutions made with any of the solvents that are adopted in wood treating. Proportions of equal parts by weight of pentachlorophenol and wood rosin or colophony are sufficient to provide a mass of considerable resistance to abrasion, crumbling and dusting and to prevent any bloom when such proportions are present in a composition in which the solvent is, for example, a Stoddard solvent naphtha or a Mid-Continent fuel oil. The masses dissolve uniformly and readily, and solutions containing 5 per cent by weight of pentachlorophenol can be obtained, a concentration which is especially effective for wood treating. When such a solution is applied to wood it provides the necessary protection while at the same time there is no crystallization or blooming of the toxic constituent. Solvents which do not dissolve such a proportion of the polychlorophenol do not provide protection of sufficient permanence and hence the particular pentachlorophenol-rosin combination, because it increases the solubility of the pentachlorophenol, permits the use of solvents not hitherto economically usable because of their failure to dissolve a sufficient proportion of the toxic chemical.

As the resinous component of our composite masses we prefer rosin or colophony, but this may be completely or partially replaced by other resins soluble in the usual inexpensive petroleum solvents, petroleum naphtha or fuel oil fractions. Petroleum or hydrocarbon resins sold under the name "Santo-Resin", rosin residues, ester gum, rosin esters, petroleum tar resins, cumarone-indene or similar solid resins may be used for this partial or complete substitution of rosin. The resins should be soluble in petroleum solvents and should be compatible with the polychlorophenols.

The polychlorophenol component may be pentachlorophenol, any of the isomeric tetrachlorophenols, chlorinated phenols of lower chlorine content, chlorinated cresols, chlorinated coal-tar acids, chlorinated wood-tar acids, chlorinated naphthols, chlorinated hydroxydiphenyls, or mixtures of any of the foregoing. A wide range of chlorinated phenolic toxic chemicals can thus be used according to our invention.

The composite masses may be further modified to adapt them to use in the preparation of liquid wood-treating baths by the incorporation therein of minor proportions of secondary materials such as wetting agents, water-repellents, insect-repellents, fire retardants, substances which exert a synergistic action on the chlorinated phenols and other materials having favorable action on the impregnation or penetration of the composition or having a desirable action in further protecting or enhancing the value of the treated article.

As examples of compositions of the invention and methods for their production, the following are typical:

One hundred pounds of technical pentachlorophenol are introduced rapidly and with agitation into one hundred pounds of a molten mass of rosin (grade K) maintained at a temperature of 140° C. The mass is stirred or agitated and heating is continued until a clear melt is obtained. The melt is then poured into a pan and allowed to cool therein. The solidified homogeneous resinous mass is then broken into pieces of desirable size for packing.

A similar composition can be made by replacing the pentachlorophenol by an equal weight of a technical tetrachlorinated phenol, which consists of a mixture of isomeric tetrachlorophenols.

The solidified masses are resinous in nature but some fine crystals of the polychlorophenol are discernible throughout. They break with a vitreous or resinous fracture.

Inasmuch as the above specification comprises preferred embodiments of the invention it is to be understood that the invention is not to be limited thereto but that it is susceptible of and contemplates such variations as are necessary to adapt it to any particular use in manners understood in the art.

We claim:

1. A solid homogeneous fused mass having a conchoidal or vitreous fracture, that is soluble in petroleum solvents of the fuel oil boiling range, consisting essentially of a polychlorophenol which normally tends to bloom when applied as a solution to wood and a resin compatible with the polychlorophenol and soluble in such petroleum solvents, the proportion of resin in said mass being sufficient to prevent substantial blooming when applied to wood as a solution in such petroleum solvents and the proportion of polychlorophenol in said mass being sufficient to provide a solution in such petroleum solvents of sufficient concentration to protect wood impregnated therewith against substantial deterioration by decay organisms and fungi.

2. A composition as defined in claim 1 and further characterized in that the polychlorophenol is selected from the group consisting of tetrachlorophenols and pentachlorophenol.

3. A composition as defined in claim 1 and further characterized in that the resin is rosin.

4. A composition as defined in claim 1 and further characterized in that the polychlorophenol is pentachlorophenol and the resin is rosin.

5. A composition as defined in claim 1 and further characterized in that the resin is an ester gum.

6. A solid homogeneous fused mass having a conchoidal or vitreous fracture, that is soluble in petroleum solvents of the fuel oil boiling range, consisting essentially of pentachlorophenol which normally tends to bloom when applied as a solution to wood together with ester gum, the proportion of ester gum in said mass being sufficient to prevent substantial blooming when applied to wood as a solution in such petroleum solvents and the proportion of pentachlorophenol in said mass being sufficient to provide a solution in such petroleum solvents of sufficient concentration to protect wood impregnated therewith against substantial deterioration by decay organisms and fungi.

KENT R. FOX.
EDMUND C. HYRY.
IRA HATFIELD.